(12) United States Patent
O'Brien

(10) Patent No.: US 7,228,310 B2
(45) Date of Patent: Jun. 5, 2007

(54) DATA MINING SYSTEM, METHOD AND APPARATUS FOR INDUSTRIAL APPLICATIONS

(75) Inventor: Christopher O'Brien, New Britain, PA (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 410 days.

(21) Appl. No.: 10/095,384

(22) Filed: Mar. 12, 2002

(65) Prior Publication Data

US 2002/0178159 A1   Nov. 28, 2002

Related U.S. Application Data

(63) Continuation of application No. 10/068,614, filed on Feb. 6, 2002, now abandoned.

(60) Provisional application No. 60/266,640, filed on Feb. 6, 2001.

(51) Int. Cl.
*G06F 15/16* (2006.01)
*G06F 17/30* (2006.01)

(52) U.S. Cl. .................... 707/102; 707/2; 709/203; 709/219

(58) Field of Classification Search ............ 707/6, 707/10, 14, 21, 20, 102, 100, 104.1, 101, 707/2; 709/219, 201, 202, 217, 223, 224, 709/203
See application file for complete search history.

(56) References Cited

U.S. PATENT DOCUMENTS

| | | | |
|---|---|---|---|
| 6,321,216 B1 * | 11/2001 | Otte et al. ............... | 706/21 |
| 6,456,997 B1 * | 9/2002 | Shukla ..................... | 707/1 |
| 6,587,754 B2 * | 7/2003 | Hung et al. .............. | 700/286 |
| 6,615,258 B1 * | 9/2003 | Barry et al. ............. | 709/223 |
| 6,633,823 B2 * | 10/2003 | Bartone et al. .......... | 702/57 |
| 6,651,062 B2 * | 11/2003 | Ghannam et al. ........ | 707/10 |
| 6,714,979 B1 * | 3/2004 | Brandt et al. ........... | 709/225 |
| 6,728,660 B2 * | 4/2004 | Bjornson .................. | 702/185 |
| 2002/0099563 A1 * | 7/2002 | Adendorff et al. ....... | 705/1 |
| 2004/0143470 A1 * | 7/2004 | Myrick et al. ........... | 705/7 |

OTHER PUBLICATIONS

Albrecht, J. Lehner, W., On-line Analytical Processing in Distributed Data Warehouses, Database Engineering and Applications Symp., 1998. Proc. IDEAS'98. International, Meeting Dates Jul. 8, 1998-Jul. 10, 1998, Published Jul. 8-10, 1998, Cardiff, UK.*

(Continued)

*Primary Examiner*—Saleh Najjar
*Assistant Examiner*—David Lazaro

(57) ABSTRACT

A data mining system directed to industrial applications gathers data remotely from a plurality of industrial plants or sites and makes the gathered data available over a network to a user running a data mining application or on-line analytical process means to generate and, if desired, visualize results. Access to a service of this nature may be made available in connection with an on-line service, such as a website, that also provides access to industrial products and services. Subscribers to the on-line service, who may be charged a fee to subscribe, may be given an incentive to continue their subscription in the form of an offer of free or reduced-cost access to the above-described data mining system during their on-line service sessions.

17 Claims, 4 Drawing Sheets

OTHER PUBLICATIONS

Han, Jiawei, Towards On-line Analytical Mining in Large Databases, ACM SIGMOD Record, vol. 27, Issue 1 (Mar. 1998), ACM Press New York, NY, USA.*

Demarest, Marc. "Building The Data Mart", Jun. 22, 1997, from www.noumenal.com/marc/marts.html☐☐Note: Based on a publication from DBMS Magazine, Jul. 1994, v. 7, n.8, p. 44.*

* cited by examiner

DATA MINING SYSTEM, METHOD AND APPARATUS FOR INDUSTRIAL APPLICATIONS

This application is a continuation of application Ser. No. 10/068,614 filed on Feb. 6, 2002 now abandoned which claims the benefit, for purposes of priority under 35 U.S.C. §119(e), of U.S. Provisional Patent Application No. 60/266,640, filed Feb. 6, 2001.

FIELD OF THE INVENTION

The invention relates to data mining and, more particularly, to a system method and apparatus for mining data and providing services related thereto using a communication system, such as the Internet, in industrial applications.

BACKGROUND

Data mining explores detailed business transactions to uncover patterns and relationships contained within a particular business activity and history. Data mining can be done manually by "slicing and dicing" the data until a pattern becomes obvious. A term of art in the field, "slicing and dicing" refers to the ability to move between different dimensions of warehoused data. It can be performed with programs that analyze the data automatically. Using computer technology to look for hidden patterns in a collection of data, data mining for marketing research, for example, might reveal that customers interested in one product will also be interested in another. In other areas, data mining can be useful in scientific research, economics, criminology, and many other fields. In general, there exists specialized database software for data mining.

A data warehouse is a database designed to support decision making in an organization. It is batch updated and can contain enormous amounts of data. Hence, the moniker "warehouse". For example, large retail organizations can have 100 GB or more of transaction history. When the database is organized for one department or function, it is often called a "data mart" rather than a data warehouse.

The data in a data warehouse is typically historical and static and may also contain numerous summaries. It is structured to support a variety of analyses, including elaborate queries on large amounts of data that can require extensive searching. When databases are set up for queries on daily transactions, they are often known as operational data stores (ODSs) rather than data warehouses.

At present, there exist no data mining services relating to industrial applications that provide data mining and data mart services as described above. Until now, data services for industrial applications have been offered by consultants who manually compile and audit data on a case-by-case basis. Such manual compilation may be inadequate to provide a complete or accurate analysis of the industry being researched. Manual accounting methods, moreover, cannot provide a continuous or virtually continuous update of the industry and are subject to human error.

SUMMARY

The long felt, but unmet, needs described above are addressed by various aspects of the system and method according to the present invention. One aspect of the present invention, for example, provides a method for retaining a client subscription to an on-line site that provides access to industrial products and services, including data mining services in connection with a data warehouse populated with data relating to at least one industrial application. According to the method, the on-line site provides access at least to industrial products and services. A subscription is offered to the client to access the on-line site. If the client accepts the subscription offer, the client is further offered at least some access to the data mining service free of charge, though is otherwise charged a fee for subscribing to the on-line site. The client subscription is thereby retained by rewarding the client with the data mining analyses service access free of charge.

In another aspect of the present invention, a method in a data mining system provides analysis services directed to industrial control-related data originating at a plurality of client industrial systems. The data mining system is in communication with the plurality of client industrial systems, is accessible over a network by a user, is associated with a data warehouse, and comprises at least one data mining application. The method comprises several steps. Industrial control-related data is collected from the plurality of client industrial systems. The collected industrial control-related data is stored in the data warehouse associated with the data mining system. User access over the network to the at least one data mining application is provided. In response to the user-directed data mining application, data is retrieved from the data warehouse and processed. Processed data is then delivered over the network to the user.

In yet another aspect of the present invention, a method is provided for delivering industrial control-related on-line services to a user during an on-line session. The method may comprise the following steps. The user is provided with access over a network to a data mining system during the on-line session. The data mining system comprises at least one application in communicatoin with a data warehouse. The data warehouse comprises data collected from among network-delivered data originating with a plurality of industrial control systems. The application allows the user to conduct analyses of data in the data warehouse and to view the results of the analyses. The user is also provided, during the same on-line session, with access to non-data mining industrial control-related content, the access provided during the same on-line session.

In a further aspect of the present invention, a method is provided for generating a data structure comprising industrial control-related content for presentation to a user over a network during an on-line session. A document is generated for presentation over the network to the customer during the on-line session. A first link is inserted into the document that, when selected by the user, points to a second document relating to an industrial-control related data mining service. A second link is inserted into the document, such that, when selected by the user, it points to non-data mining industrial control-related on-line content. The user is thereby provided access to the industrial control-related data mining service as an incentive to also access the non-data mining industrial control-related on-line content.

In still another aspect of the present invention, a data mining system provides analysis services directed to industrial control-related data originating at a plurality of client industrial systems. The data mining system is in communication with the plurality of client industrial systems and is further accessible over a network by a user. The data mining system is associated with a data warehouse and comprises at least one data mining application. The system comprises data collection means adapted for collecting data from the plurality of client industrial systems, a data warehouse coupled to the data collection means and adapted for storing data collected from the plurality of industrial systems, on-line analytical processing means coupled to the data warehouse and adapted for analyzing industrial systems data, and user-interface means for presenting to the user the results of on-line analytical processing.

Various other aspects of the system and method according to the present invention are illustrated, without limitation, in the figures, the description below, and the appended claims.

DETAILED DESCRIPTION

Figure 1:
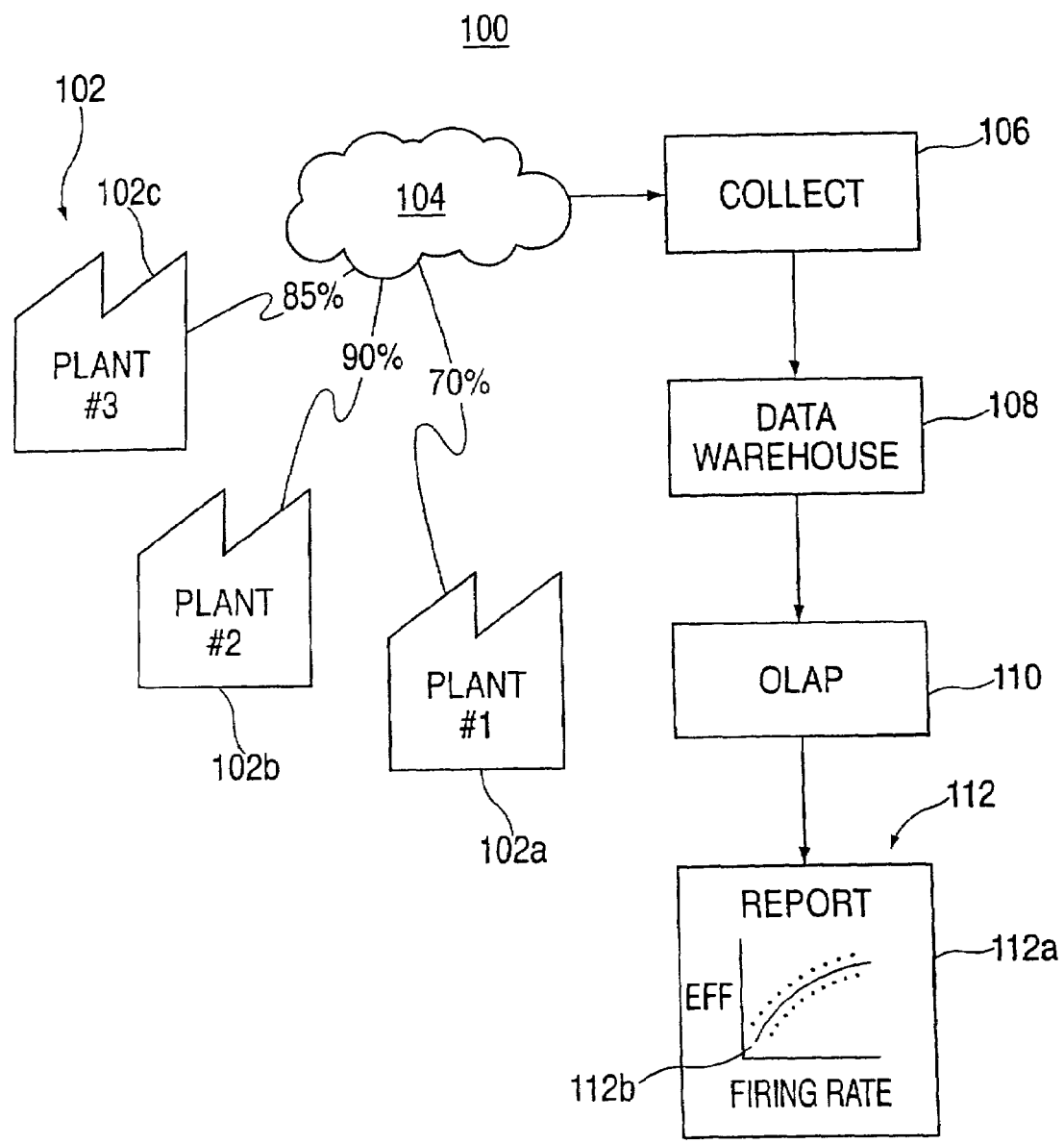
FIG. 1 is a diagram of an embodiment of a system according to the present invention.

FIG. 1 shows a system diagram 100. One or more remote sites 102, in this instance industrial plants or sites 102a-102c, are coupled to an on-line communication network 104, such as the Ethernet, Internet, Intranet, local area network or the equivalent. The connection between the remote sites 102 and the communication network 104 is accomplished in accordance with any of the known protocols including, but not limited to, TCP/IP, ModBus, etc. Information or data is collected by a collection mechanism 106. The collection mechanism 106 in one aspect is performed automatically by, for example, software. This may be implemented using any of the known scripting languages, such as HTML or Java.

The data collected by the collecting mechanism 106 is stored in data warehouse 108. On-Line Analytical Processing (OLAP) 110, sometimes referred to as "multi-dimensional analysis," analyzes the data stored in the data warehouse 108 according to a predetermined analysis routine. Such routine may be implemented automatically by software. A report 112 is generated according to predetermined processing. In one aspect, the processing, which may be software driven, provides a user-specific report 112a in a predetermined format, such as a best practices chart 112b. As illustrated, the best practices chart may plot the efficiency of a particular piece of equipment, such as an industrial machine. As shown in FIG. 1, the best practices chart plots efficiency versus the firing rate of the equipment.

In one implementation, the remote sites 102 are the clients, i.e., users. A client may be an industrial manufacturer that may wish to measure the efficiency of its plant or its equipment, for example, a boiler. Data collected from boilers at remote sites 102a-c are uploaded through the communication network 104. The information is collected by collection mechanism 106 and stored in data warehouse 108. The data stored in the data warehouse is data to be mined by the OLAP 110. In one aspect, the OLAP 110 is designed according to information entered on the specific type of equipment and model, boilers in this example, regarding the efficiency of such equipment.

The data is sliced into data marts (or markets) according to predetermined parameters set either by the user or the OLAP 110 software programmers, i.e., the service provider. For example, the data may be sliced into machines of a particular type, such as boilers. Such a cross-section, from equipment having a common characteristic, provides the user with superior data points with which to compare the user's own equipment. An example of such a common characteristic might be the external temperature of the equipment. This would populate the data market with information on equipment in similar temperature environments to determine, for example, the efficiency of equipment when this external factor puts a load on the equipment. External temperature may be obtained using isothermal maps available off the Internet. Other common factors, such as the age of equipment, geographic location and industry usage may alone, or in combination, be factors taken into account in accordance with the present invention.

The data market may comprise data with any predetermined characteristic including data collected from equipment having dissimilar features or used in disparate contexts. For example, it such a boiler in a warehouse, a school or a food processing plant. The user may use the data market to ascertain a cross-section of information regarding the efficiency of boilers more effectively than with the existing method of manually compiling information provided by consultants.

Figure 2:
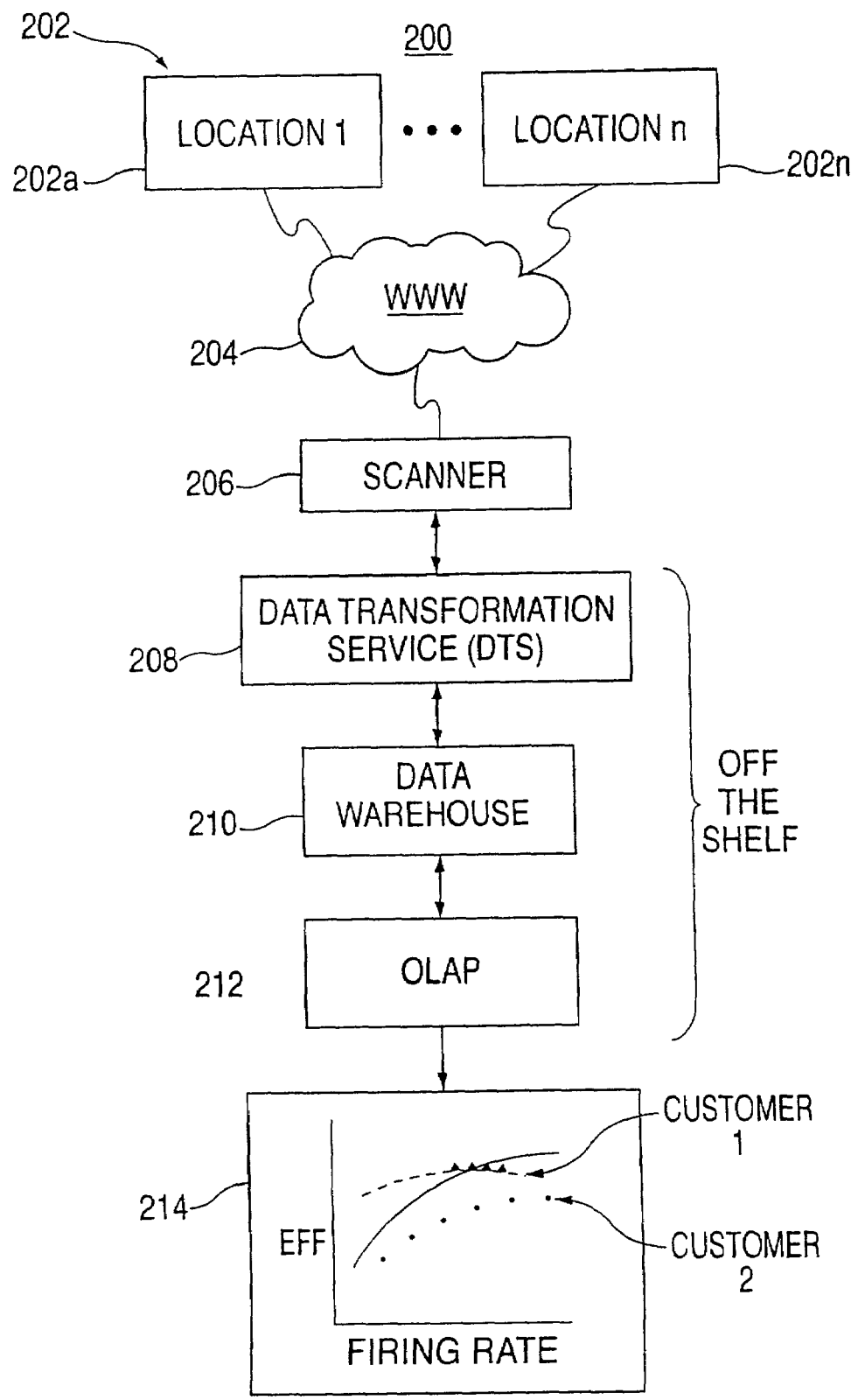
FIG. 2 is a flow diagram of an embodiment of a method according to the present invention.

With reference to the flow diagram shown in FIG. 2, the remote sites 202 (102, in FIG. 1), may be one or more locations (e.g., industrial operations) (202a . . . 202n). The locations are in communication with a central database, via a communication network 204. Scanner 206 periodically or continuously connects to one or more of the remote sites to collect data. The scanner may do this either automatically or at the prompting of the service provider. In addition, the user may upload information at their discretion. In the boiler example, the scanner may download fuel consumption data or steam output information, for example. Of course, the scanner may download any pre-selected information that is selected for populating the data warehouse.

A Data Transformation Service (DTS) 208 mechanism scrubs the data that has been scanned and uploaded by the scanner 206. Data scrubbing is a well known technique that filters incoming data so that unnecessary data is removed and does not waste data warehouse space. The DTS, for example, may remove the internet routing address or other data that may not be useful for determining the efficiency of the boiler in the above example. The scrubbed data is then stored in data warehouse (D/W) 210. The Online Analytical Processing (OLAP) mechanism 212 analyzes and processes the data in the warehouse 210. The data may be sorted and redistributed into smaller data warehouses called data markets, or marts. These data marts may include data representative of specific characteristics of the piece of equipment under consideration.

The DTS 208, Data Warehouse mechanism 210 and OLAP 212 may be implemented using off-the-shelf software, hardware, firmware or a combination of them. Software and hardware for the DTS 208, Data Warehouse and OLAP 212 may be procured through well-known public vendors or original equipment manufacturers (OEM). For example, the data warehouse hardware and software is publicly available from Oracle Sequel 2000. The OLAP processes may presently be obtained from Knosis, Inc. of Boise, Id., e.g., its Knosis product, which may be launched using Microsoft Excel 2000. Other vendors include Applix, Inc. of Westboro, Mass., Brio Technology, Inc. of Palo Alto, Calif., and Business Objects of San Jose, Calif.

Next, a chart 214, in this case a best practices chart, is created based on the result of the on-line analytical processing 212. In FIG. 2, the best practices chart may plot efficiency versus firing rate for boilers from which data has been collected for two customers. Data collected for each of the two customers is plotted relative to an ideal best practice curve. As shown in the figure, the plot for customer 1 exceeds the ideal best practice at lower firing rates, but falls below it at higher rates. This plot for customer 2 lies below the ideal best practice curve for all firing rates.

The industrial process best practice analysis of the present invention may be instantaneous as well as continuous, since the data from the various remote sites may be scanned and updated to the data market for analysis virtually immediately. Any combination of factors can be selected to determine the choice of data, the characteristics of the data to be presented and the manner in which the data is presented to the client, i.e., user. The present invention provides confidentiality to the users because the users access the best practices information through the Internet. It is a simple matter to maintain confidentiality of the user located at the far end.

Figure 3:
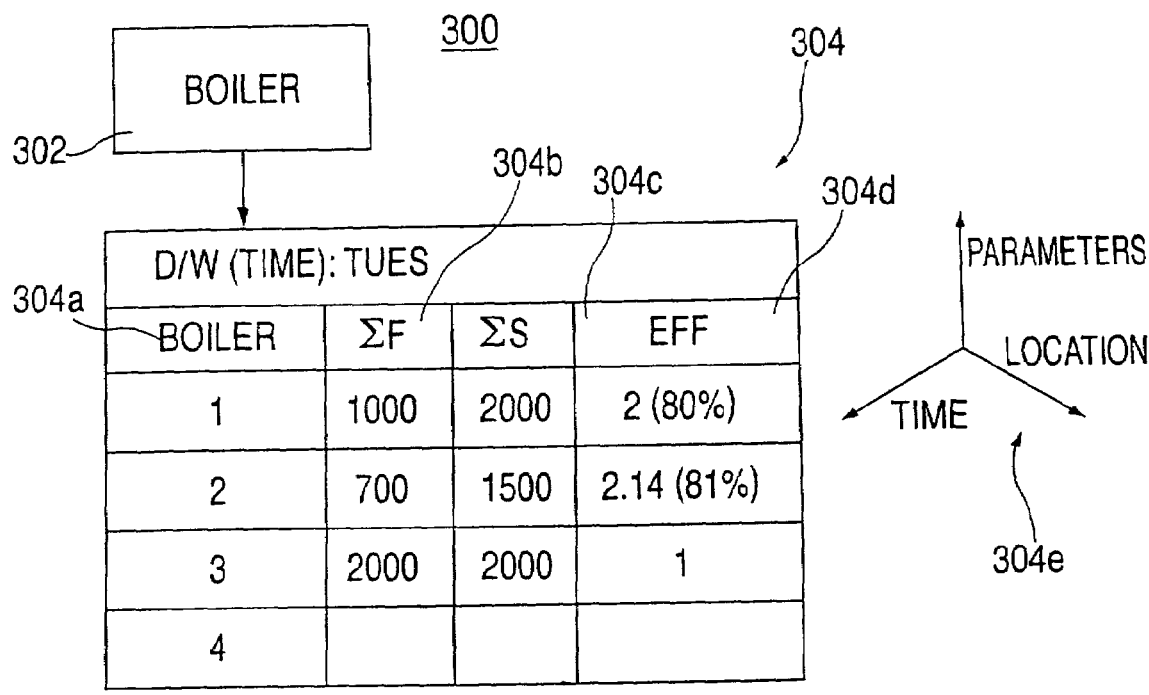
FIG. 3 is a diagram of an embodiment of a system according to the present invention, illustrating real-time analysis.

The best practices chart and the OLAP 212 processing will now be described in more detail with respect to the diagram 300 shown in FIG. 3. A boiler 302, for example, is equipped with sensors to detect operating parameters such as the total fuel used or the total steam produced. That information is uploaded, via the communication network, to the data warehouse. The information is "sliced" or otherwise processed, by the scanner 206, DTS 208, or other means and is stored in the data warehouse 304. In this instance, the data warehouse 304 is logically organized according to the arrangement shown in FIG. 3, wherein the data is collated according to equipment number 304*a*, i.e., boiler number, and one or more parameters relating to the respective equipment, i.e., total fuel 304*b* or total steam 304*c*. The known efficiency equation that relates steam to fuel is used to generate the efficiency number 304*d* that is stored, as well, in the data warehouse 304. Other equations or relationships could as easily be used. In addition, the data warehouse 304 may be organized as multi-dimensional abstract space, the dimensions of which are defined by two or more variables. In the example shown in FIG. 3, the data warehouse may be arranged according to a 3-dimensional space 304*e*. In another example, a multi-dimensional space may comprise dimensions corresponding to time, location and equipment parameters. Arranged in this manner, the OLAP 212 sorts and processes the data according to one or more of the dimensions.

Figure 4:
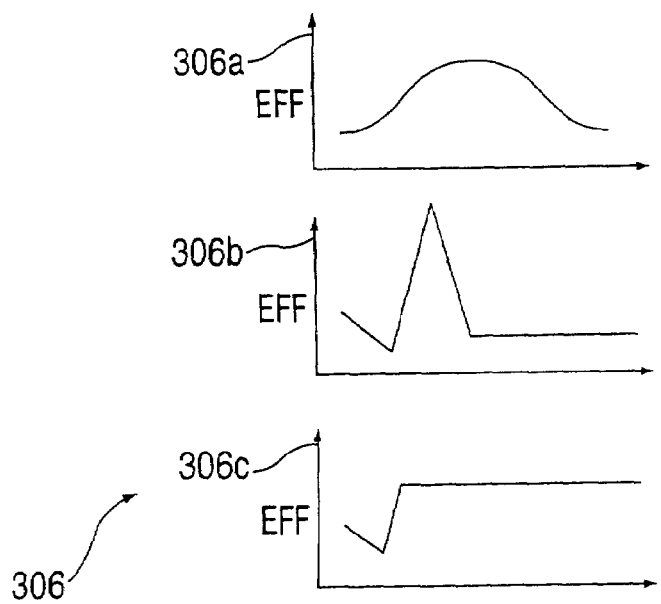
FIG. 4 set forth real time processing charts.

As shown in FIG. 4, OLAP 212 may process the data in the warehouse (or data mart) 304, thereby providing a real time analysis. In the figure, multiple types of OLAP processing charts 306*a* to 306*c* are shown. Each of the charts represents a different efficiency response curve for respective pieces of equipment. For example, chart 306*a* illustrates a typical response curve, wherein the equipment functions with a predicted and continuous efficiency over a range. Chart 306*b* illustrates an atypical problem scenario, wherein the plotted equipment efficiency data briefly spikes at a particular point as a result of an equipment problem. Chart 306*c* illustrates a situation in which the equipment operates nearly constantly over a period of time. OLAP 212 can arrange and manipulate the data to allow the user to flexibly view the data from particular points of view. For example, the OLAP 212 can arrange the data according to geographic region, allowing for prediction of how processes might be run in relation to a particular feature common to the region, such as temperature or altitude. Further, the OLAP 212 can provide instantaneous snapshots of the functioning of the equipment at any time. The user is able to view current equipment performance, or can evaluate past performance trends in performance.

Another aspect of the present invention relates to a business method and the process and system for implementing it. The method provides the industrial data mining tools in an on-line forum that also provides industrial applications, products and services. In one embodiment, the data mining services are provided at a discount or free of charge to attract and retain customers that visit the on-line service in order to cross-sell other industrial products and services. In another embodiment, subscribers that pay for data mining capability are blandished with other industrial products and services at a discount, as well as other industrial-related content.

Figure 5:
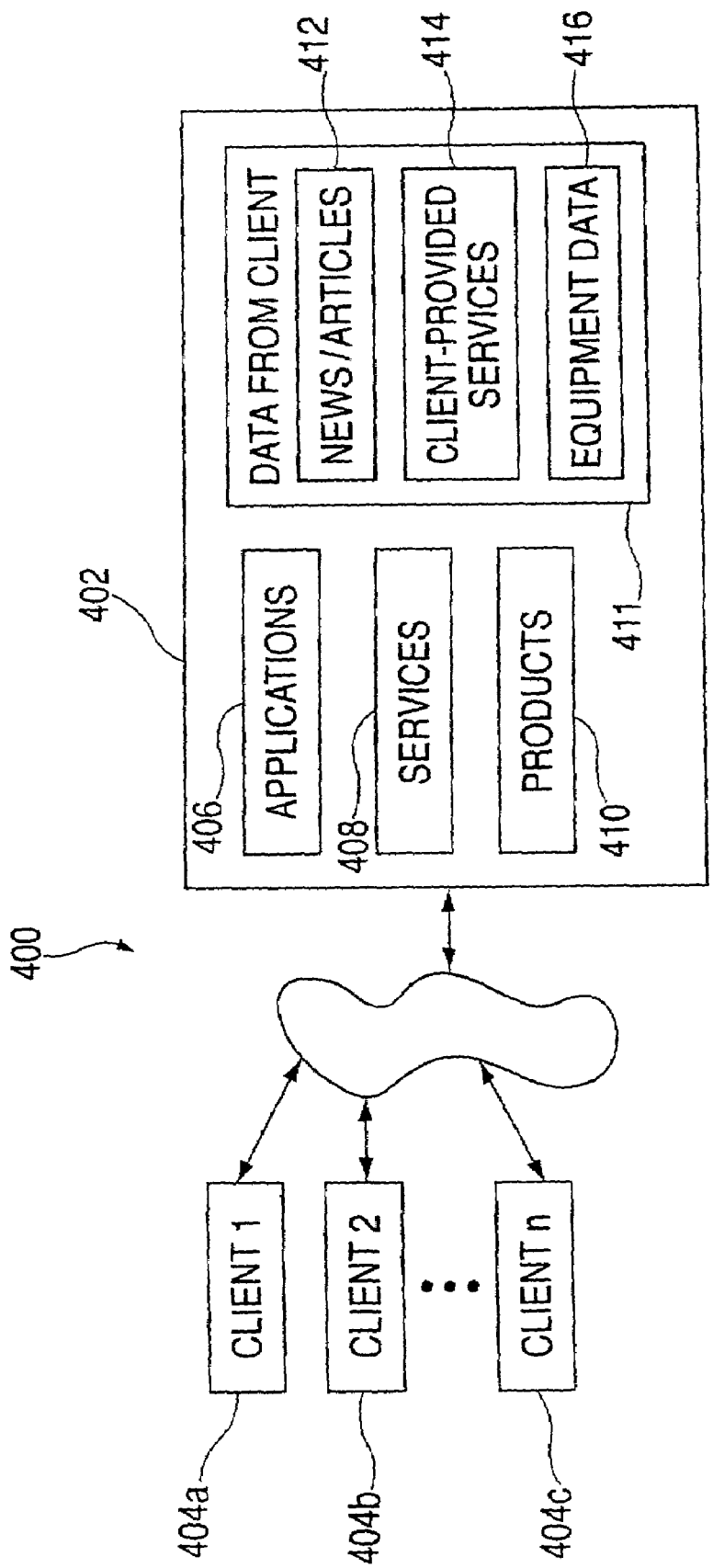
FIG. 5 is a diagram of an embodiment of a business model according to the present invention.

As shown in FIG. 5, business plan 400 employs a web site 402 that supports interactive use by clients 1 . . . n (404) 404*a, b* and *c*. The forum site provides customers with applications 406, services 408 and/or products 410. The site is designed to be interactive. That is, the client is provided with the capability of providing data to the web site. Such data may include news and/or articles 412 relevant to the industrial market. The data may also include services 414 provided by the client to either the web site or to other clients. Further, the data may be equipment data 416 uploaded to the web site from the remote site to populate the data warehouse.

In one aspect of the business plan, the clients are locked in as long term customers by providing them with one or more of the application 406, services 408 or products 410 as free on-line offerings, or at a dramatically reduced cost, in exchange for a long-term, fee-based membership to the industrial products and services on-line offering. The on-line offering generates revenue by charging for a subscription fee in return for the right to be members of the web site. Alternatively, or in addition, use of one or more of the applications, products or services may incur a charge. The applications, products or services may be provided on a surcharge or commission basis. For example, use of services provided by a client may incur a commission fee in return for providing the forum in which the clients meet and arrange to agree upon the thing to be exchanged.

In another aspect of the business plan, the clients are provided free data mining services. This may include free access to the OLAP resource 212. That is, the client will be able to access the data warehouse information and employ the OLAP resource 212 to slice the data in any manner that the client desires. This is done, for example, to obtain best practice information for industrial equipment, such as boilers. In return for such services, the client may pay a subscription fee for the on-line forum. In the alternative, the web site may provide such free services in order to entice users to view and/or visit advertisements and/or web sites relating to the content of the web site, i.e., industrial applications.

In other words, the business model may be characterized as customer driven: the customer provides the information and, indeed, may provide it to other customers. This differs from the traditional method of providing manual consulting services, in which a vendor provides and mines the data for the client. The business model of the present invention may include other features as well. A proactive business model, i.e., customer or service driven, may provide periodic reports to the user. These reports may be in the form of weekly or monthly reports. The periodic reports may have a predetermined format designated by the user. The report may be formatted to best communicate the information to the client according to the user's particular industrial operation.

Another aspect of the business model is to provide a performance guarantee service. In other words, in order to incentivize the purchasing of products and services provided over the web site, the business model offers a guarantee on the performance of such product or service. According to a further implementation of the business model, the incentivization program may be provided as part of the subscription in order to attract users to the web site and entice them to become long term members. In the alternative, users may purchase the guarantee on a per-item basis.

Another feature of the business plan is to provide inventory control for the user. In more detail, the user is provided with software applications on-line that provide optimized maintenance, deliveries, etc. For example, the inventory control allows the user to ensure that the optimal amount of equipment is supplied to the user remote site at any instant in time. This encourages long-term use of the website, because a will come to depend on the optimal inventory control.

Another aspect of the business plan is to provide preventative maintenance control in order to incentivize long-term subscription to the web site. The web site provides reports and predictions of equipment failure based on the data analysis performed by the OLAP 110 on the data in the data mart. Further, the model may include a crisis response, such as alarm and/or dial out capability for automatically alerting the user to an actual or potential crisis identified automatically by the OLAP 110, sensors, etc. In addition, there may be provided the service of reporting historical operations of the user's equipment or operation. Such a service is useful, from a business point of view because it addresses user's business need to perform such reporting, as is normally performed by quality control departments.

Each of the above-described features of the business model are sources of revenue and can create and incentive for a user to retain the subscription to the web site for a relatively long period of time. Further, it is by design that the business plan encourages the user to return to the site frequently to monitor the user's operations and to lock the user in so that the user need not seek any other source for product or service, particularly relating to the industrial field. In essence, the business plan of the present invention provides a one-stop shopping forum that satisfies all or nearly all of the user's industrial application and product needs.

In addition to the embodiments of the aspects of the present invention described above, those of skill in the art will be able to arrive at a variety of other arrangements and steps which, if not explicitly described in this document, nevertheless embody the principles of the invention and fall within the scope of the appended claims.

I claim:

1. A data mining system for providing analysis services directed to industrial control-related data originating at a plurality of subscriber industrial systems, the data mining system in communication with the plurality of subscriber industrial systems, the data mining system further accessible over a network by a user subscriber, the data mining system being associated with a data warehouse and comprising at least one data mining application, the system comprising:

data collection means adapted for collecting data from the plurality of subscriber industrial systems;

a data warehouse accessible to subscribers, the data warehouse coupled to the data collection means and adapted for storing data, wherein the data is collected from the plurality of subscriber industrial systems and provided to the data warehouse by a plurality of subscribers and wherein the data provided by each subscriber is available to all subscribers;

on-line analytical processing means coupled to the data warehouse and adapted for analyzing industrial systems data;

user-interface means for presenting to the user subscriber the results of on-line analytical processing;

a program application for segregating the data warehouse into one or more data marts, each data mart being segregated according to parameters set by a subscriber and having applicability with a different industrial system;

a program application for data mining said data warehouse;

a website to receive the subscribers' industrial systems data uploaded by each subscriber; wherein the uploaded data populates the data warehouse;

a program application for scrubbing the data when scanned by eliminating header data;

wherein each data mart is formed from data sorted and redistributed from the data warehouse where all industrial systems data is stored in a single location accessible to all subscribers; and wherein each industrial system comprises industrial equipment.

2. The system according to claim 1, wherein said network is on the internet.

3. The system according to claim 1, wherein the data mining program application data mines efficiency of industrial equipment.

4. The system according to claim 3, wherein the data mining program application generates a best practices chart from the data regarding the industrial system.

5. The system according to claim 4, wherein the industrial system relates to the efficiency of an industrial boiler.

6. The system according to claim 4, further comprising a program application for generating a best practices chart plots an efficiency curve.

7. The system according to claim 4, further comprising a program application for taking a snap shot of the best practices of a particular industrial application at any moment in time.

8. The system according to claim 7, wherein said program application takes several snap shots of the best practices for a plurality of moments in time for said particular industrial application.

9. They system according to claim 8, further comprising a program application for generating a report based on a study of the best practices across the plurality of moments of time to provide the user subscriber with trends information.

10. The system according to claim 1, wherein said program application for segregating the data warehouse into one or more data marts offers to the user data mining access to one or more of said data marts.

11. The system according to claim 1, further comprising OLAP software as the data mining application.

12. The system according to claim 1, wherein said program application segregates the data warehouse according to a cross-section of equipment having similar characteristics.

13. The system according to claim 12, wherein said program application segregates according to isothermal maps.

14. The system according to claim 12, wherein said program application segregates according to dissimilar features.

15. The system according to claim 12, wherein said program application further comprises uploading the parameters by which the data marts are segregated.

16. The system according to claim 1, further comprising a program application for reporting the data mining results in real time to the user subscriber.

17. The system according to claim 1, wherein at least one of the plurality of subscriber industrial systems, is maintained by a subscriber other than the user subscribers.

* * * * *